United States Patent
Mellquist et al.

(10) Patent No.: US 11,301,276 B2
(45) Date of Patent: Apr. 12, 2022

(54) CONTAINER-AS-A-SERVICE (CAAS) CONTROLLER FOR MONITORING CLUSTERS AND IMPLEMETING AUTOSCALING POLICIES

(71) Applicant: Hewlett Packard Enterprise Development LP, Houston, TX (US)

(72) Inventors: Peter Erik Mellquist, Roseville, CA (US); Bret Alan McKee, Santa Cruz, CA (US); Frederick Miles Roeling, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/908,042

(22) Filed: Jun. 22, 2020

(65) Prior Publication Data
US 2021/0397465 A1 Dec. 23, 2021

(51) Int. Cl.
*G06F 9/455* (2018.01)
*G06F 9/50* (2006.01)

(52) U.S. Cl.
CPC ........ *G06F 9/45541* (2013.01); *G06F 9/5083* (2013.01)

(58) Field of Classification Search
CPC ............................ G06F 9/45541; G06F 9/5083
See application file for complete search history.

(56) References Cited

U.S. PATENT DOCUMENTS

| | | |
|---|---|---|
| 10,162,682 B2 | 12/2018 | Smola et al. |
| 10,860,362 B2 | 12/2020 | Lal |
| 2013/0297802 A1 | 11/2013 | Laribi et al. |
| 2015/0222515 A1 | 8/2015 | Mimura et al. |
| 2019/0097900 A1 | 3/2019 | Rodriguez et al. |

(Continued)

FOREIGN PATENT DOCUMENTS

| | | |
|---|---|---|
| CN | 110502349 A | 11/2019 |
| CN | 110569101 A | 12/2019 |

OTHER PUBLICATIONS

AWS, "AWS Outposts", available online at <https://web.archive.org/web/20200616102338/https://aws.amazon.com/outposts/>, Amazon Web Services, Jun. 16, 2020, 14 pages.

(Continued)

*Primary Examiner* — Gregory A Kessler
(74) *Attorney, Agent, or Firm* — Jaffery Watson Mendonsa & Hamilton

(57) ABSTRACT

Embodiments described herein are generally directed to a controller of a managed container service that facilitates autoscaling based on bare metal machines available within a private cloud. According to an example, a CaaS controller of a managed container service monitors a metric of a cluster deployed on behalf of a customer within a container orchestration system. Responsive to a scaling event being identified for the cluster based on the monitoring and an autoscaling policy associated with the cluster, a BMaaS provider associated with the private cloud may be caused to create an inventory of bare-metal machines available within the private cloud. Finally, a bare metal machine is identified to be added to the cluster by selecting among the bare-metal machines based on the autoscaling policy, the inventory and a best fit algorithm configured in accordance with a policy established by or on behalf of the customer.

20 Claims, 12 Drawing Sheets

(56) References Cited

U.S. PATENT DOCUMENTS

2019/0122156 A1     4/2019    Asthana et al.
2021/0117241 A1     4/2021    Xia

OTHER PUBLICATIONS

Google Cloud, "Anthos", available online at <https://web.archive.org/web/20200617004603/https://cloud.google.com/anthos/>, Jun. 17, 2020, 20 pages.

HPE, "HPE Gen10 Security Reference Guide", Feb. 2019, 183 pages.

Rancher, "Deliver Kubernetes-as-a-Service", available online at <https://web.archive.org/web/20200618135109/https://rancher.com/products>, Jun. 18, 2020, 5 pages.

Red Hat, Inc., "OPENSHIFT 4.4: The Kubernetes platform for big ideas", available online at <https://web.archive.org/web/20200404130306/https://www.openshift.com/>, Apr. 4, 2020, 6 pages.

Vincent Meoc, "Container as a Service with VMware Admiral," Sep. 26, 2016, pp. 1-7, Retrieved from the Internet on Mar. 23, 2020 at URL: <vmcloud.fr/2016/09/container-as-a-service-with-vmware-admiral-html>.

Cloudhedge, "Automated Containerization," 2020, pp. 1-6, Retrieved from the Internet on Mar. 23, 2020 at URL: <cloudhedge.io/automated-containerization/>.

Hashicorp, "Use Cases", Introduction to Terraform, 2020, pp. 1-4, Retrieved from the Internet on Mar. 11, 2020 at URL: <terraform.io/intro/use-cases.html>.

Jason Hennessey et al., "Hardware as a Service—Enabling Dynamic, User-level Bare Metal Provisioning of Pools of Data Center Resources," May 8, 2015, pp. 1-2.

Mohamed K. Hussein et al., "A Placement Architecture for a Container as a Service (CaaS) in a Cloud Environment," Journal of Cloud Computing: Advances, Systems and Applications, May 29, 2019, pp. 1-15.

Packet, "Kubernetes Cluster Autoscaler," 2020, pp. 1-7, Retrieved from the Internet on Mar. 3, 2020 at URL: <packet.com/resources/guides/kubernetes-cluster-autoscaler-on-packet/>.

Vijaya Krishna, "Comparing Configuration Management Tools: Chef vs. Puppet vs. Ansible," Nov. 5, 2018, pp. 1-5, Retrieved from the Internet on Mar. 11, 2020 at URL: <gspann.com/resources/blogs/puppet-vs-chef-vs-ansible>.

Xudong Pang et al., "Efficient Bare Metal Auto-scaling for NFV in Edge Computing," 2018, pp. 67-79, Springer International Publishing AG.

| ClusterItem { | |
|---|---|
| id | string($uuid)<br>example: d290f1ee-6c54-4b01-90e6-d70174810851 |
| name | string<br>example: My K8s Cluster |
| blueprintId | string($uuid)<br>example: d290f1ee-6c54-4b01-90e6-d70174810851 |
| createdDate | string($date-time)<br>example: 2016-08-29T09:12:33.001Z |
| lastUpdateDate | string($date-time)<br>example: 2016-08-29T09:12:33.001Z |
| state | string<br>example: ready<br>Enum: [ pending, ready, error, offline ] |
| } | |

| | |
|---|---|
| BlueprintItem {<br>  id | string($uuid)<br>example: d290f1ee-6c54-4b01-90e6-d701748f0851 |
|   name | string<br>example: Simple Kubernetes Cluster |
|   version | string<br>example: 1.0.0 |
|   k8sVersion | string<br>example: latest |
|   createdDate | cstring($date-time)<br>example: 2016-08-29T09:12:33.001Z |
|   lastUpdateDate | string($date-time)<br>example: 2016-08-29T09:12:33.001Z |
|   machineSpec | string<br>example: bmaas |
|   clusterSpec | string<br>example: rke |
|   storageSpec | string<br>example: nimble |
|   master   {<br>    quantity | integer<br>example: 1 |
|     size<br>  } | string<br>example: small<br>Enum: [ nano, micro, small, medium, large, xlarge, 2xlarge ] |
|   worker   {<br>    quantity | integer<br>example: 1 |
|     size<br>  } | string<br>example: medium<br>Enum: [ nano, micro, small, medium, large, xlarge, 2xlarge ] |
|   helm   {<br>    repository | string<br>example: https://github.com/helm/charts |
|     charts<br>  }<br>} | string<br>example: List [ "fluentd", "prometheus" ] |

*FIG. 5*

Cluster Blueprint 605

```
"id": "d290f1ee-6c54-4b01-90e6-d701748f0851",
"name": "Simple Example Cluster",
"k8sversion": "latest",
"createdDate": "2015-07-20T15:49:04-07:00",
"lastUpdateDate": "2015-07-20T15:49:04-07:00",
"machineSpec": "bmaas",
"clusterSpec": "rke",
"storageSpec": "nimble",
"master": {
    "quantity": 1,
    "size": "small"
},
"worker": {
    "quantity": 1,
    "size": "medium"
},
"helm": {
    "Repository": "https://github.com/helm/charts",
    "charts": "[\"fluentd\",\"prometheus\"]"
```

*FIG. 6*

CONTAINER-AS-A-SERVICE (CAAS) CONTROLLER FOR MONITORING CLUSTERS AND IMPLEMETING AUTOSCALING POLICIES

BACKGROUND

Cloud providers deliver cloud computing based services and solutions to businesses and/or individuals. Virtual hardware, software, and infrastructure may be rented and provider-managed to deliver services in accordance with a variety of cloud service models including Container as a Service (CaaS), Virtual Machine as a Service (VMaaS), Storage as a Service (STaaS), and Bare Metal as a Service (BMaaS).

BRIEF DESCRIPTION OF THE DRAWINGS

Embodiments described here are illustrated by way of example, and not by way of limitation, in the figures of the accompanying drawings in which like reference numerals refer to similar elements.

FIG. 4 illustrates data associated with a cluster item of a blueprint meta-language or schema in accordance with an example embodiment.

FIG. 5 illustrates data associated with a blueprint item of a blueprint meta-language or schema in accordance with an example embodiment.

FIG. 6 illustrates a cluster blueprint in accordance with an example embodiment.

DETAILED DESCRIPTION

Figure 1:
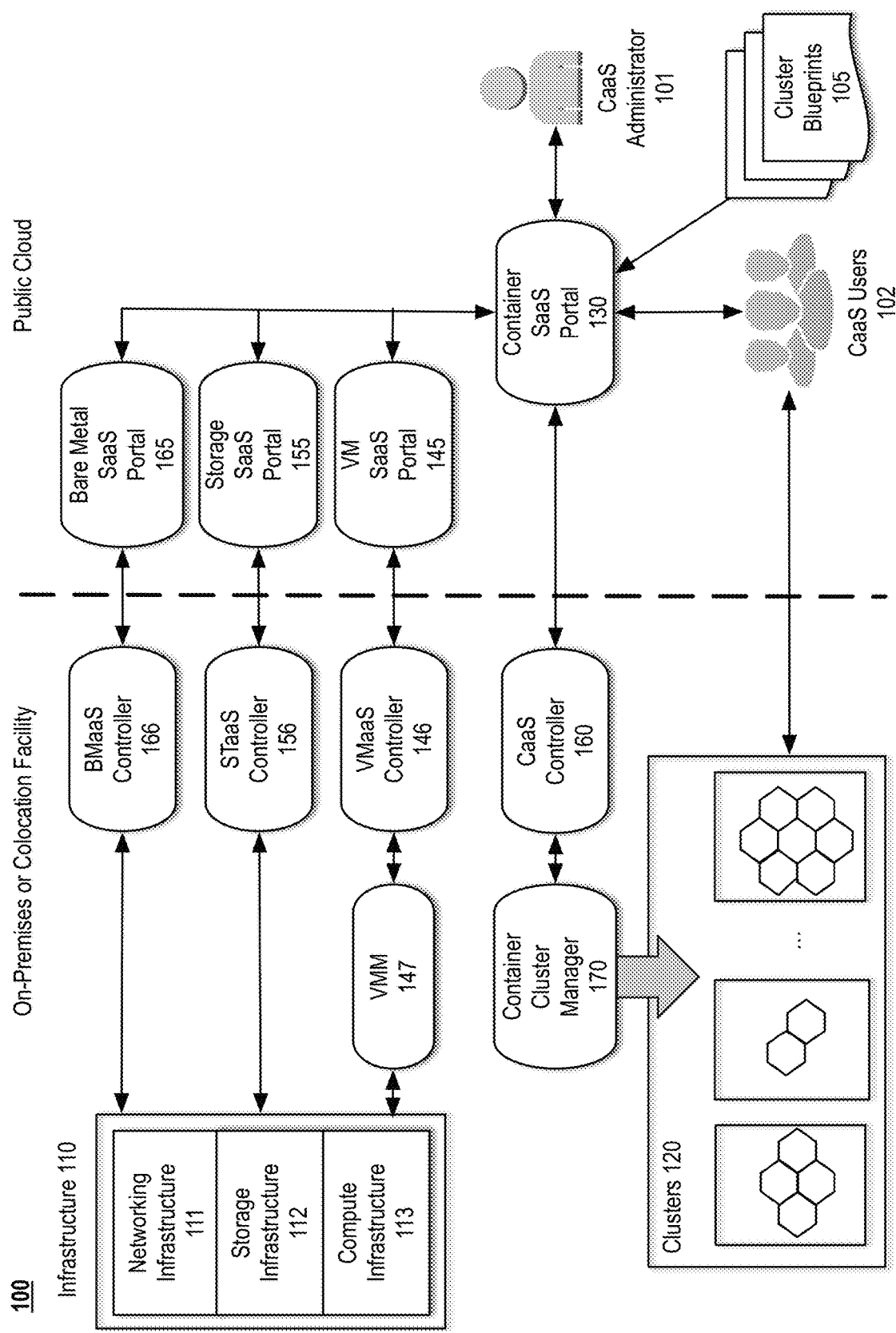
FIG. 1 is a high-level block diagram conceptually illustrating a distribution of components of a system architecture of a managed container service in accordance with an example embodiment.

Embodiments described herein are generally directed to a controller of a managed container service that facilitates autoscaling based on bare metal machines available within a private cloud. In the following description, numerous specific details are set forth in order to provide a thorough understanding of example embodiments. It will be apparent, however, to one skilled in the art that embodiments described herein may be practiced without some of these specific details.

As a practical manner, public cloud providers tend to have virtually infinite pools of cloud machines. So, public cloud providers do not have to deal with a number of issues that arise in the context of private clouds. For example, CaaS on bare-metal infrastructure within an environment (e.g., a premises or co-location facility of an organization, entity, or individual, for example, representing a customer of the cloud provider and/or the CaaS) having a limited machine inventory in terms of the number and/or diversity of the types of servers requires a bit more finesse than simply creating a virtual machine based on an essentially limitless hardware pool. As such, autoscaling processing relating to a cluster (e.g., Kubernetes or Docker) within a limited-machine-inventory environment should take into consideration a variety of tradeoffs. For example, when multiple bare metal machines are available in the inventory that have resources (e.g., in terms of processor, memory, network capacity, and/or storage performance) in excess of a machine specification identified by the autoscaling policy associated with the cluster, one or more policy-based constraints (e.g., machine cost, cost of operation (power, cooling, etc.), performance, reliability (availability), security, etc.) defined by the cloud provider and/or a CaaS user or administrator may be employed to identify a best fit for a new machine to be added to the cluster as a result of a scale out or scale up action. A similar approach may also be used when removing a machine from a cluster, for example, responsive to a scale in or scale down action.

While for sake of brevity embodiments described herein may focus primarily on selection of bare metal machines in a limited machine inventory environment, the methodologies are equally applicable to creation and management of hybrid clusters involving both physical and virtual infrastructure and/or clusters spanning public and private clouds.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein "cluster information" generally refers to information indicative of resources desired for a cluster. In some embodiments, cluster information may include a specification from bare metal aspects to container application aspects. For example, aspects specified by cluster information may include overall cluster parameters, machine type, networking features, storage specifications, and service definitions. In various embodiments described herein, the cluster information may be represented in the form of a cluster blueprint, which may be used to define the cluster specifics including compute, storage and networking and how these are to be assembled to build a complete functional cluster (e.g., Kubernetes or Docker).

As used herein, an "excess resource metric" generally refers to a metric indicative of an existence of resources in excess of those required to satisfy the needs of a cluster. For example, assuming a candidate machine in a machine inventory having 10 processor cores and 1 Terabyte (TB) of memory, such a candidate machine would have both excess processing capacity and memory capacity in comparison to a new cluster request indicative of a need for a machine with 2 processor cores and 128 Gigabytes (GB) of memory. Excess resource metrics may be used to quantify these excess resources in raw form (e.g., 8 excess processor cores and 872 GB excess memory) or may be normalized (e.g., 0.8 excess processing capacity and 0.872 excess memory capacity).

FIG. 1 is a high-level block diagram conceptually illustrating a distribution of components of a system architecture 100 of a managed container service in accordance with an example embodiment. In various embodiments described herein, the managed container service offers operating system virtualization using containers (e.g., provides Docker containers and Kubernetes orchestration as a service) using infrastructure of a customer's private cloud (e.g., an on-premises data center or a colocation facility). The managed container service may facilitate deployment and operation of cloud native applications for a variety of use cases, including, but not limited to Edge, Artificial Intelligence/Machine Learning (AI/ML), High Performance Compute (HPC). The managed container service may provide a fully-managed solution in which a managed service provider (MSP) operates CaaS instances and assist with the deployment and operation of customers' container-based workloads. According to one embodiment, cluster information may be supplied to a SaaS-based service (e.g., container SaaS portal 130) to define cluster specifics including compute, storage and networking and how these are to be assembled to build a complete functional cluster and a set of controllers (e.g., BMaaS controller 166, STaaS controller 156, VMaaS controller 146, and CaaS controller 160) carry out the instantiation of the cluster in accordance with the cluster information. The resultant cluster may then be consumed by a user (e.g., one of CaaS users 102) and managed by a cluster manager (e.g., container cluster manager 170).

In the context of the present example, components residing within a private cloud (e.g., an on-premises data center or a colocation facility) are shown on the left and components residing within a public cloud are shown on the right. In one embodiment, private cloud components include infrastructure 110, the BMaaS controller 166, the STaaS controller 156, the VMaaS Controller 146, a virtual machine manager (VMM) 147, the CaaS controller 160, and the container cluster manager 170; and public cloud components include a bare metal SaaS portal 165, a storage SaaS portal 155, and the container SaaS portal 130.

According to one embodiment, the container SaaS Portal 130 represents a web-based portal in the form of a cloud hosted multi-tenant service that allows creation of a physical cluster, a virtual cluster or a hybrid cluster based on cluster information, for example, in the form of cluster blue prints 105, which may be predefined or created by a CaaS administrator 101 and/or CaaS users 102. In one embodiment, the use of cluster blueprints 105 facilitates the creation by a user of a complete functional cluster including compute, networking and storage resources as well as a set of applications to be deployed by simply referencing an existing blueprint. A catalog of blueprints may be provided to allow a user to choose a blueprint from the catalog that matches their needs. For example, there may be predefined blueprints that allow for creation of Artificial Intelligence/Machine Learning (AI/ML) clusters as well as other predefined blueprints for general compute clusters. A non-limiting example of a cluster blueprint is described below with reference to FIG. 6.

Continuing with the present example, CaaS administrator 101 and CaaS users 102 may make use of the container SaaS portal 130 to perform various life-cycle management (LCM) operations relating to clusters (e.g., Kubernetes or Docker) that are based on the infrastructure 110, which may include physical and/or virtual infrastructure, including networking infrastructure 111, storage infrastructure 112 and compute infrastructure 113. The LCM operations may include initial compute cluster creation, cluster modification in which infrastructure is added to or removed from a cluster, cluster updates in which existing infrastructure may be modified, and the destruction of a cluster. In one embodiment, Application Programming Interfaces (e.g., Representational State Transfer (REST) APIs) provided by the container SaaS portal 130 support full LCM operations on clusters and are based on the OpenAPI (Swagger) definition. The status of cluster LCM operations may be tracked from the container SaaS portal 130 or from the Kubernetes command line, for example. The container SaaS portal 130 may also use REST to communicate with other services (e.g., the bare metal SaaS portal 165, the storage SaaS portal 155, and the VM SaaS portal 145) upon which it depends to obtain information about the infrastructure 110 and/or and implement various tasks associated with the LCM operations. Further details regarding a non-limiting example of the container SaaS portal 130 are described below with reference to FIG. 2.

The bare metal SaaS portal 165 may represent a web-based portal in the form of a cloud hosted service of a particular BMaaS provider (which may be the same or a different provider than the cloud provider) that interacts with the BMaaS controller 166 to carry out various aspects of instantiation of the cluster. For example, the BMaaS controller 166 may be used to install the appropriate firmware and software onto a bare metal machine selected for inclusion with a cluster by the CaaS controller 160.

Similarly, the storage SaaS portal 155 and the VM SaaS portal 145 may represent web-based portals of respective STaaS and VMaaS providers used by the customer and which are used to interface with the infrastructure 110 via the STaaS controller 156 and the VMaaS controller 146, respectively. In one embodiment, the VMaaS controller 146 may make use of the VMM 147 to create appropriately sized control plane nodes to run a container control plane for the requested cluster. Advantages of the layered approach implemented by system architecture 100 include enabling the container SaaS portal 130 to be built on other "as a service" offerings (e.g., BMaaS, STaaS, and VMaaS) of the cloud provider or a third-party provider, facilitating extensibility to include other offerings (e.g., networking and compute), as well as enabling the creation of value-add services on top of CaaS or Kubernetes as a Service (KaaS). More or fewer types of infrastructure or providers may be supported depending upon the needs of the particular implementation, for example, by adding or removing appropriate SaaS portals and associated controllers.

In the context of the present example, the CaaS controller 160 runs on-premises and is controlled by the container SaaS portal 130. In one embodiment, the CaaS controller 160 may be a Kubernetes cluster and may be controlled via kubectl API calls invoked by the container SaaS portal 130. In such a scenario, the CaaS controller 160 is effectively a bootstrap cluster that allows target clusters (e.g., clusters 120) to be created and managed. In some embodiments, one or more of the BMaaS controller 166, the STaaS controller 156, and the VMaaS controller 146 may also be integrated into the bootstrap cluster, for example, using "kube-native" methods. Further details regarding a non-limiting example of the CaaS controller 160 are described below with reference to FIG. 3.

The container cluster manager 170 may be responsible for installing a container orchestration system on newly provisioned nodes. In one embodiment, the container cluster manager 170 includes a "Kubernetes Engine" (e.g., Hewlett Packard Enterprise (HPE) Container Platform, Rancher Kubernetes Engine (RKE), Loodse Kubermatic Container Engine, Google Kubernetes Engine (GKE), Kubernetes+ Cluster API, or others) to install Kubernetes and create a cluster. After the cluster is created, the CaaS controller 160 may monitor the state of the cluster and can take corrective action if needed. For example, if a machine fails in a way that cannot be repaired, another machine can be allocated, provisioned and added to the cluster to replace the failed machine.

The various portals (e.g., bare metal SaaS portal 165, storage SaaS portal 155, VM SaaS portal, and container SaaS portal 130) and controllers (e.g., BMaaS controller 166, STaaS controller 156, VMaaS controller 146, and CaaS controller 160) and the functionality performed by them may be implemented by hardware, software, firmware and/or a combination thereof. For example, the portals and controllers may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry.

While for sake of simplicity various examples may be described with reference to a single customer or a single customer site (e.g., on-premises datacenter or colocation facility), it is to be appreciated that the various portals described herein may interact with controllers associated with multiple customers and/or distributed across multiple sites. Additionally, although in the present example, the controllers and SaaS portals are shown distributed between the private cloud and public cloud in a particular manner, depending upon the particular implementation these components may be distributed differently. For example, one or more of the controllers (e.g., the CaaS controller 160) may be provided within a public cloud. Also, the same or different system architectures (e.g., system architecture 100) may be implemented for one or more customers of the cloud provider. It is further contemplated that various components of the system architecture may be implemented by the same or different vendors or service providers. For example, a cloud provider that has one or more existing "as a service" offerings may leverage such existing offerings and/or may make use of third-party services.

Figure 2:
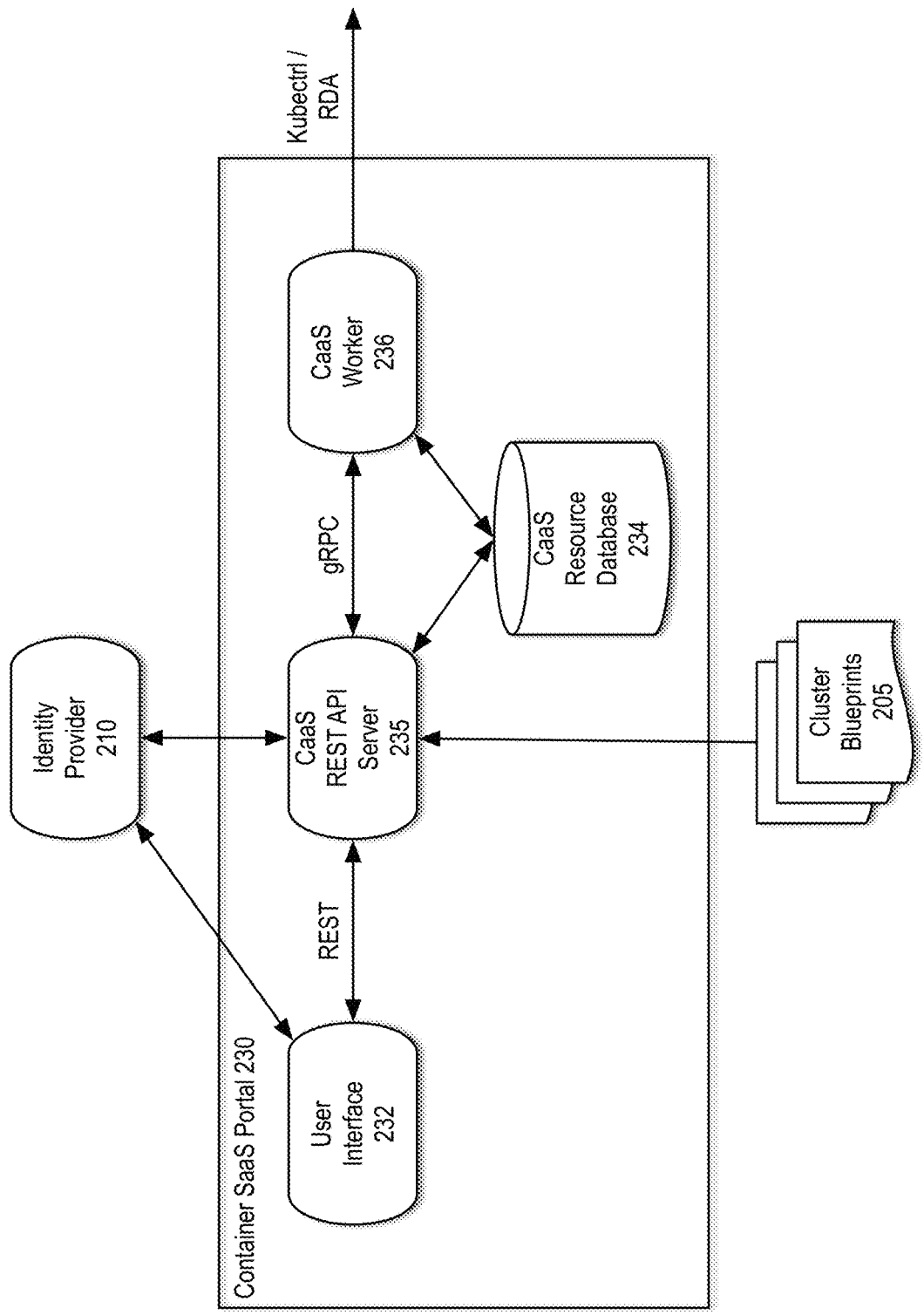
FIG. 2 is a block diagram conceptually illustrating various functional units of a container SaaS portal in accordance with an example embodiment.

FIG. 2 is a block diagram conceptually illustrating various functional units of a container SaaS portal 230 in accordance with an example embodiment. In the context of the present example, the container SaaS portal 230 includes a user interface 232, a CaaS REST API server 235, a CaaS worker 236, and a CaaS resource database 234. In one embodiment, the user interface 232 and the CaaS REST API server 235 represent a northbound interface (or frontend) for accepting REST requests to perform Create, Read, Update and Delete (CRUD) operations on clusters in accordance with cluster blueprints 205 and persists them in the CaaS resource database 234. For example, the CaaS REST API server 235 may provide self-service APIs for users (e.g., CaaS users 102) to create their own clusters (e.g., Kubernetes clusters) and administrator APIs for CaaS administrators (e.g., CaaS administrator 101) to create and assign cluster to groups of users.

According to one embodiment, separation of concerns and scaling may be addressed by implementing a backend in the form of one or more workers (e.g., the CaaS worker 236) of the container SaaS portal 230 that are responsible for ensuring that operations requested via the REST interface of the container SaaS portal 230 are realized. In the context of the present example, an internal inter-processor communication (IPC) mechanism (e.g., gRPC Remote Procedure Call (gRPC)) is utilized to communicate between the frontend and the backend and the CaaS worker 236 may communicate information regarding cluster requests to the CaaS controller (e.g., CaaS controller 160) via kubectl over Remote Data Access (RDA).

In one embodiment, role-based access control (RBAC), for example, supported by identity provider 210, may be used to securely accommodate the needs of different user personas. In this manner, for example, separation can be achieved between (i) cloud provider operations or administrative personnel (e.g., CaaS administrator 101) that use the container SaaS portal 230 to operate and manage customers' managed container environments and (ii) customers' (tenants') self-service users (e.g., CaaS users 102) of the container SaaS portal 230 for CaaS and/or KaaS.

Figure 3:
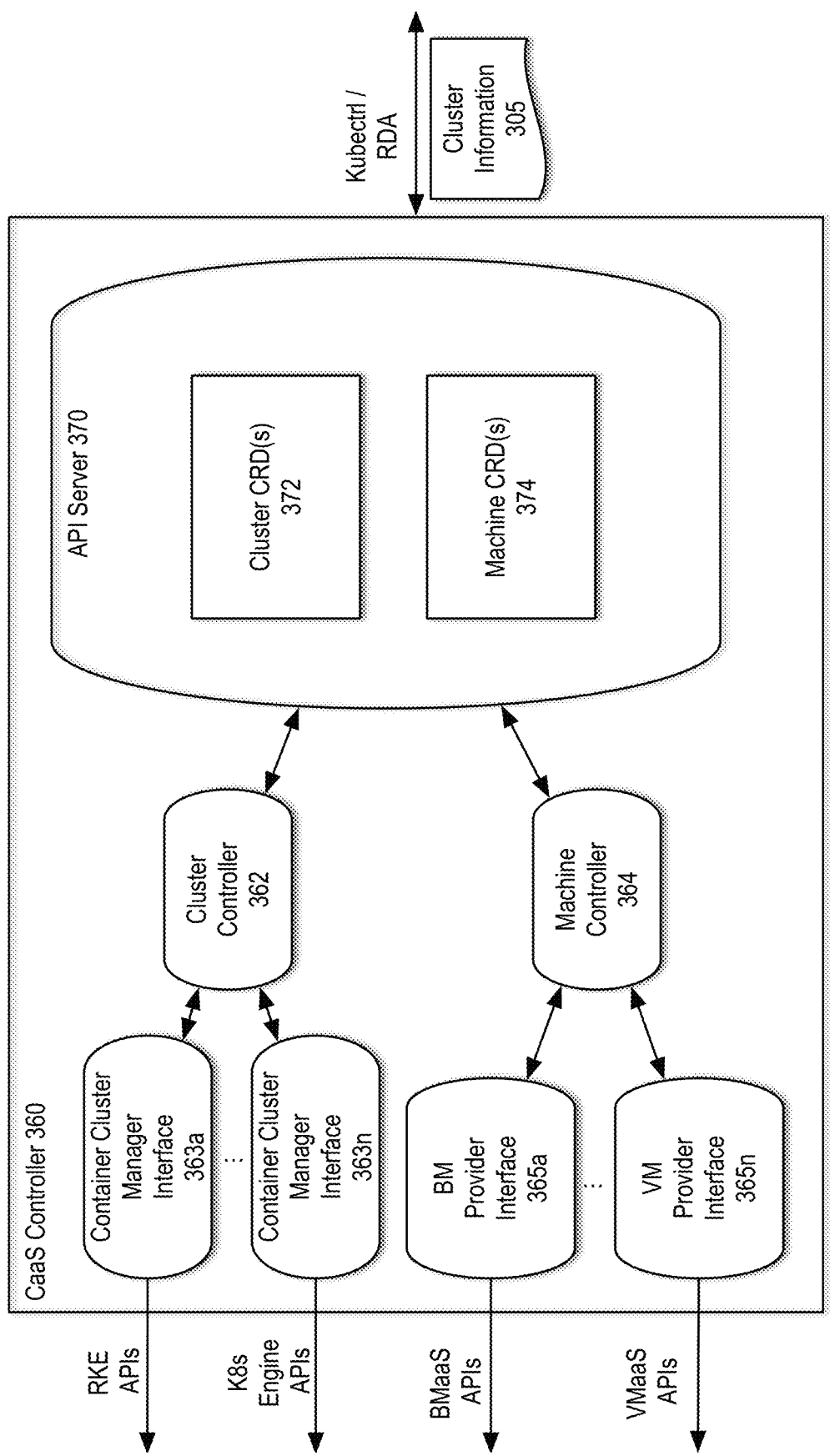
FIG. 3 is a block diagram conceptually illustrating various functional units of a CaaS controller in accordance with an example embodiment.

FIG. 3 is a block diagram conceptually illustrating various functional units of a CaaS controller 360 in accordance with an example embodiment. In the context of the present example, the CaaS controller 360 includes an API server 360, a cluster controller 362, container cluster manager interfaces 363*a-n*, a machine controller 364, and various provider interfaces 365*a-n*. The CaaS controller 360 and the functionality performed by the CaaS controller 360 them may be implemented by hardware, software, firmware and/or a combination thereof. For example, the CaaS controller 360 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry.

According to one embodiment, creation of a cluster involves selection or input of cluster information 305 (e.g., in the form of a cluster blueprint (e.g., cluster blueprint 105)) via a CaaS SaaS portal (e.g., container SaaS portal 130). The CaaS SaaS portal may control the CaaS controller 360 via API calls (e.g., kubectl API calls) to the API server 370. In the present example, the API server 370 provides Custom Resource Definitions (CRDs) (e.g., cluster CRD(s) 372 and machine CRD(s)) for various objects supported by the managed container service, including, for example, a cluster, a machine, a machine set, and a machine deployment. Depending upon the particular implementation, the CRDs may be based on Kubernetes community "Cluster API" CRDs.

Cluster objects may provide a high level description of their respective clusters including an Internet Protocol (IP) address, Domain Name Service (DNS) information, and the like. In one embodiment, machine objects are agnostic to physical versus virtual machines and include provider-specific details for the desired machines. Machine set objects may be supported to allow specification of a set of multiple machines. Machine deployment objects may be used to automate upgrades.

Responsive to the cluster CRD(s) 372, the cluster controller 362 may direct cluster operations to an appropriate container cluster manager interface 363a-n. For example, depending upon a cluster specification indicated within the cluster information 305, the cluster controller 362 may use container cluster manager interface 363a to interact with an RKE Kubernetes distribution or container cluster manager interface 363n to interact with another type of Kubernetes engine.

Similarly, machine controller 364 may be responsible for directing machine operations to an appropriate provider interface 365a-n. Depending upon a machine specification indicated within the cluster information 305, the machine controller 364 may use BM provider interface 365a to interact with a BMaaS provider (e.g., via BMaaS APIs associated with a bare metal SaaS portal (e.g., bare metal SaaS portal 165)) and VM provider interface 365n to interact with a VMaaS provider (e.g., via VMaaS APIs associated with a VM SaaS portal (e.g., VM SaaS portal 145)). For example, machine controller 364 may utilize Terraform providers for infrastructure (e.g., BMaaS, VMaaS or any IaaS) and Ansible playbooks to manage installed OS components (e.g., Docker, agents, base configurations, and initial Helm charts).

FIG. 4 illustrates data associated with a cluster item 400 of a blueprint meta-language or schema in accordance with an example embodiment. In various embodiments described herein, declarative models may be used for cluster LCM using cluster blueprints (e.g., cluster blueprints 105 or 205). In one embodiment, a blueprint meta-language (e.g., JavaScript Object Notation (JSON), YAML Ain't Markup Language (YAML), and/or the Terraform language) or schema, includes (i) the cluster blueprint, (ii) machine blueprints defining different types of compute resources to be used as part of the cluster blueprint; (iii) networking blueprints defining networking topologies and features for the cluster; (iv) storage blueprints defining storage to be used within the cluster; and (v) service blueprints defining services to be pre-installed on a newly created cluster.

In the context of the present example, cluster item 400 includes an ID, a name, a blueprintID, a createdDate, a lastUpdateDate, and a state. The ID may be a string representing a unique identifier (e.g., a Universally Unique Identifier (UUID)) for the cluster. The name may be a string representing a user-assigned name to the cluster and which may be displayed in the catalog, for example. The blueprintID may be a string representing a unique identifier (e.g., a UUID) for a blueprint item associated with the cluster. The createdDate may indicate the date and time at which the cluster was created and may be represented in the form of a string. The lastUpdateDate may indicate the date and time at which the cluster was last updated and may be represented in the form of a string. The state, for example, monitored and updated by a CaaS controller (e.g., CaaS controller 160) may be selected from a predefined set of enumerated values (e.g., pending, ready, error, or offline) and may be represented in the form of a string.

FIG. 5 illustrates data associated with a blueprint item 500 of a blueprint meta-language or schema in accordance with an example embodiment. The blueprint item 500 may declaratively describe the desired cluster, for example, including master and worker node sizes, amounts, and quality attributes (e.g., availability and performance). Cluster blueprints may also define required storage and networking characteristics as well as other curated services to deploy, for example, cluster and workload observability services. Depending upon the particular implementation, cluster blueprints may also include service-specific representations of desired state as well as other well-known representations (e.g., Terraform infrastructure plans).

In the context of the present example, blueprint item 500 includes an ID, a name, a version, a k8sVersion, a createdDate, a lastUpdateDate, a machine specification, a cluster specification, a storage specification, and information regarding desired master and worker nodes. As described above with reference to the cluster item, the ID may be a string representing a unique identifier (e.g., a UUID) for the blueprint. The name may be a string representing a user-assigned name to the blueprint and which may be displayed in the catalog, for example. The createdDate may indicate the date and time at which the blueprint was created and may be represented in the form of a string. The lastUpdateDate may indicate the date and time at which the blueprint was last updated and may be represented in the form of a string. The machine specification may include information indicative of the provider for the desired machine. The cluster specification may include information indicative of the desired container cluster manager (e.g., container cluster manager 170), for example, the desired Kubernetes engine. The storage specification may include information indicative of a type of storage infrastructure (e.g., storage infrastructure 112) to be used in the cluster.

FIG. 6 illustrates a cluster blueprint 605 in accordance with an example embodiment. In the context of the present example, cluster blueprint 605 defines a Kubernetes cluster to be created via RKE having one small master node and one medium bare metal-based worker node.

The various portals and controllers described herein and the processing described below with reference to the flow diagrams of FIGS. 7-9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 10 below.

Figure 7:
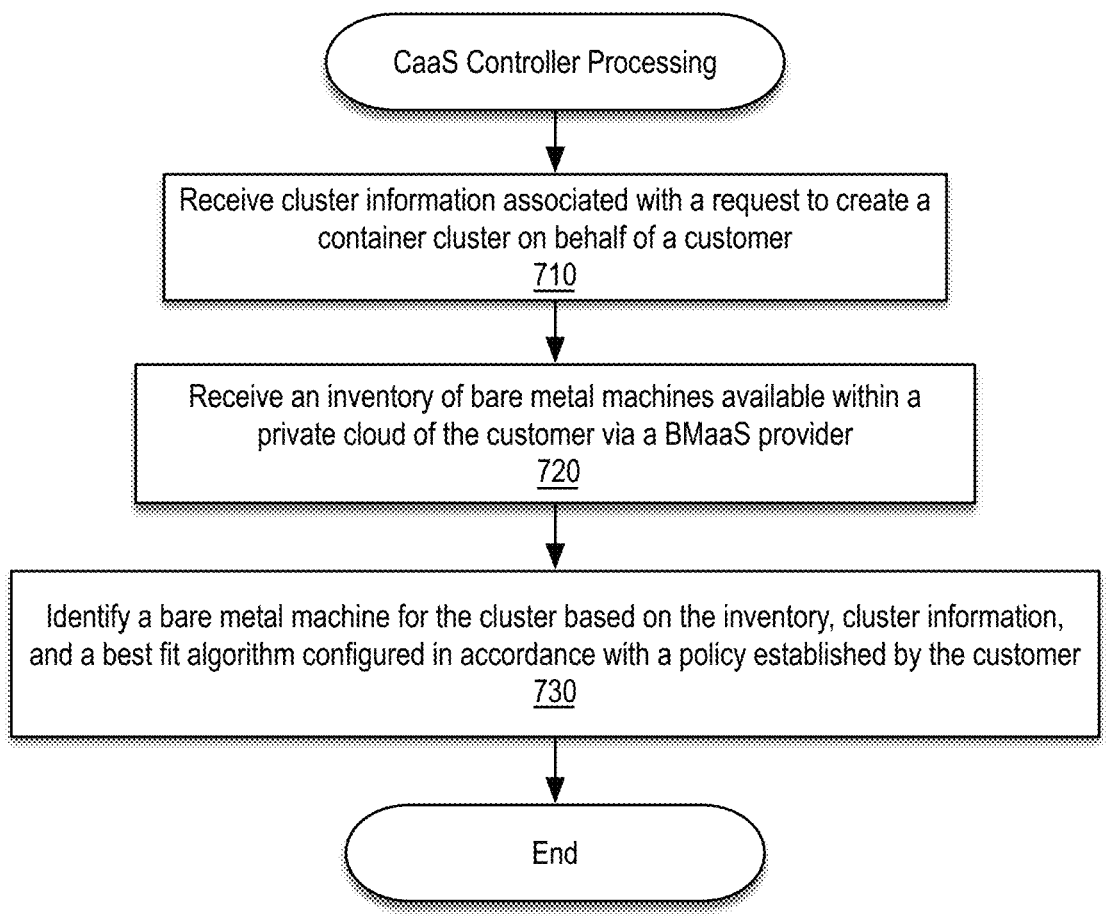
FIG. 7 is a flow diagram illustrating CaaS controller processing in accordance with an example embodiment.

FIG. 7 is a flow diagram illustrating CaaS controller processing in accordance with an example embodiment. In the context of the present example, a cloud provider may have been engaged by a particular customer or multiple customers to provide and support a managed container service that makes use of their private cloud infrastructure, for example, including bare metal servers.

At block 710, cluster information associated with a request to create a container cluster on behalf of a customer is received by a CaaS controller. According to one embodiment, the CaaS controller (e.g., CaaS controller 160) runs within a customer's private cloud, for example, on on-premises infrastructure or infrastructure within a colocation facility used by the customer. The CaaS controller may receive the cluster information in the form of a cluster blueprint (e.g., cluster blueprint 105) from a container SaaS portal (e.g., container SaaS portal 130) running in the same or a different private or public cloud as the CaaS controller. Depending upon the particular implementation the cluster information may declaratively describes the desired cluster. For example, a cluster blueprint may be selected by a CaaS user (e.g., CaaS user 102) from a predefined set of cluster blueprints presented via a user interface (e.g., user interface 232) in which the selected cluster blueprint includes master and worker node sizes, amounts, and quality attributes (e.g., availability and/or performance). Cluster blueprints may also define desired storage and networking characteristics as well as other curated services to deploy, for example cluster and workload observability services. Cluster blueprints may also include system-specific representations of desired state as well as other well-known representations (e.g., Terraform infrastructure plans).

At block 720, an inventory of bare metal machines available within a private cloud of the customer is received via a BMaaS provider. According to one embodiment, the inventory contains real-time information indicative of respective resources (e.g., a number of processor cores, an amount of memory, network capacity, and/or storage performance) for one or more types of infrastructure (e.g., infrastructure 110), including a set of bare metal machines, that are currently available (e.g., are not currently deployed for use by another cluster) for use in connection with supporting the managed container service. Depending upon the particular implementation, the inventory may be requested from the BMaaS provider by the CaaS controller directly (e.g., via a bare metal SaaS portal of the BMaaS provider) or indirectly (e.g., via the CaaS portal).

In various embodiments, the inventory may include or otherwise be mapped to metadata or other information associated with the available bare metal machines for use in connection with prioritizing, guiding, directing or otherwise influencing machine selection, for example, by optimizing, minimizing, or maximizing various factors or conditions, Non-limiting examples of the metadata or other information include information indicative of one or more of machine characteristics/attributes (e.g., cost, power consumption, heat, performance, security, reliability, etc.) in the form of relative or absolute metrics/ratings or raw or normalized data.

At block 730, a bare metal machine is identified for the cluster based on the inventory received in block 720, the cluster information received in block 710, and a best fit algorithm configured in accordance with a policy established by or on behalf of the customer. Despite the customer having a variety of bare metal machine configurations, it is unlikely the customer will have a sufficient number of such configurations to precisely match the range of all potential cluster requests. For the sake of example, suppose the managed container service uses four enumerated sizes (Small, Medium, Large, Extra Large) for four resources: processor, memory, network capacity, and storage performance. In this example, there are 256 combinations of the resources, but it is unlikely that the customer will have 256 different machine configurations to choose from and the number of possibilities grows very rapidly as the enumerated categories increase and/or as resources are added. Because it is impractical for a customer to attempt to have bare metal machine configurations that meet every possible machine specification that may be desired by a CaaS user, it is desirable to have a machine selection process to facilitate selection of an appropriate machine from the available inventory to satisfy the user's request. For example, while a number of the available machines may have sufficient resources to meet the needs indicated by the user's request, some of the machines may have one or more types of resources in excess of those needed by the desired cluster or may be likely to be needed to service other cluster requests. As such, embodiments described herein provide a policy-based approach to allow the cloud provider and/or the customer to express one or more machine-selection priorities to be applied as part of a best fit algorithm. Non-limiting examples of best fit processing that may be part of the best fit algorithm are described below with reference to FIGS. 8 and 9.

In the context of various examples described herein, the CaaS user may specify the desired cluster in a form in which resources are described at a reasonably high level. While it is possible to have the user specify a machine with particularity, for example, a particular model of a particular manufacturer with a particular type of processor, a specific amount of memory, and a particular type of Graphics Processing Unit (GPU), it is typically more efficient for a user to specify a machine based on something more abstract. Depending upon the particular manner in which the machines are categorized, an internal mapping of these categories (e.g., sizes) to the reality presented to the user may be utilized as part of the machine selection process.

Figure 8:
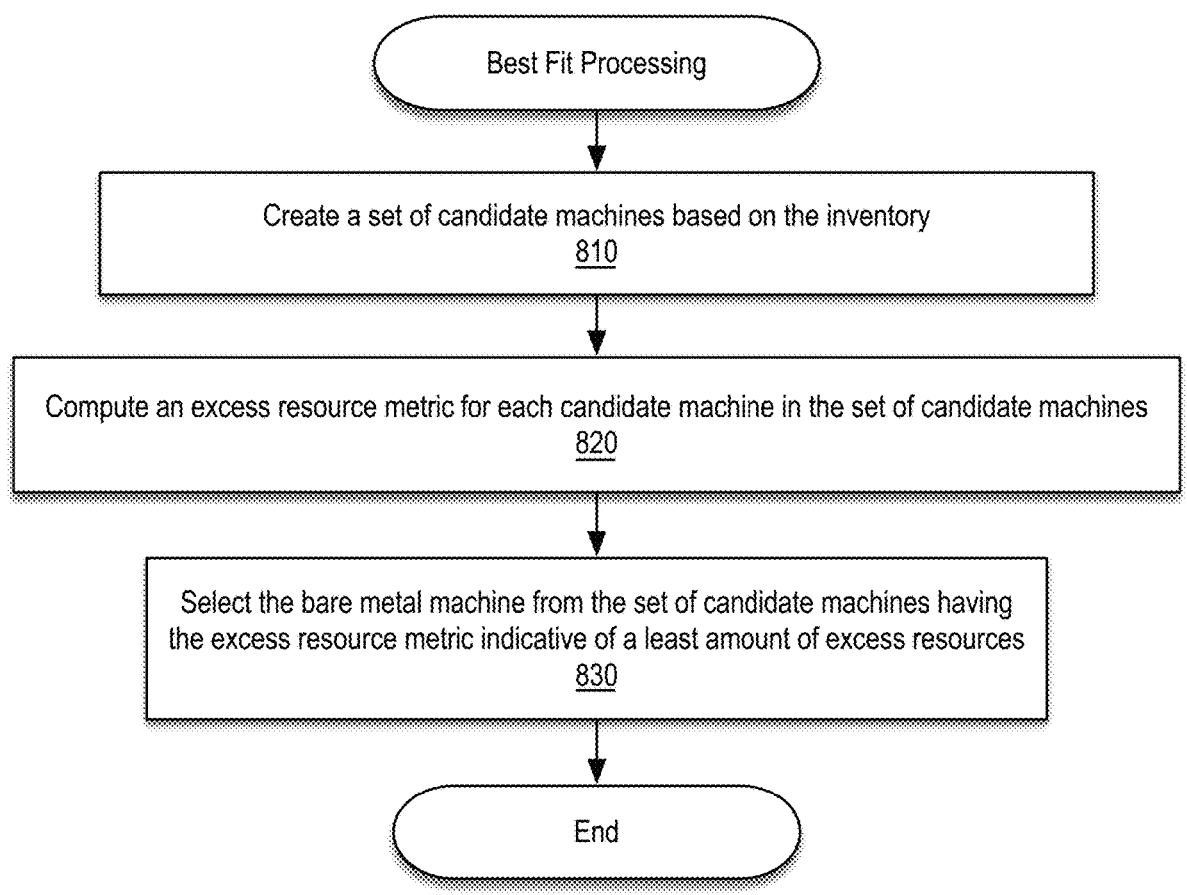
FIG. 8 is a flow diagram illustrating best fit processing in accordance with an example embodiment.

FIG. 8 is a flow diagram illustrating best fit processing in accordance with an example embodiment. At block 810, a set of candidate machines is created based on the inventory. According to one embodiment, the set of candidate machines is a subset of the available bare metal machines in the inventory that have sufficient resources to satisfy the cluster request. That is, each candidate machine in the set of candidate machines has resources equal to or greater that indicated by the request. Identification of the candidate set may involve using an internal mapping of machine categories to corresponding resource ranges to transform a cluster request expressed in terms of a machine category to explicit quantities of resources. Then, for each available machine in the inventory the amount of each type of resource needed to satisfy the request may be compared to corresponding amounts of each type of resource of the machine configuration to determine whether to add the available machine to the candidate set.

At block 820, an excess resource metric for each candidate machine in the set of candidate machines is calculated. According to one embodiment, the excess resource metric may be calculated concurrently with the identification of the candidate set. Alternatively, the excess resource metric may be performed after the candidate set has been completed. The calculation may involve subtracting the amount of resources needed to satisfy the request from those available as part of a particular machine configuration and aggregating or averaging the results for each type of resource into a single excess resource metric. Alternatively, the excess resource metric may comprise multiple components—one for each type of resource.

At block 830, a bare metal machine in the set of candidate machines having the excess resource metric indicative of a least amount of excess resources is selected for the cluster.

Figure 9:
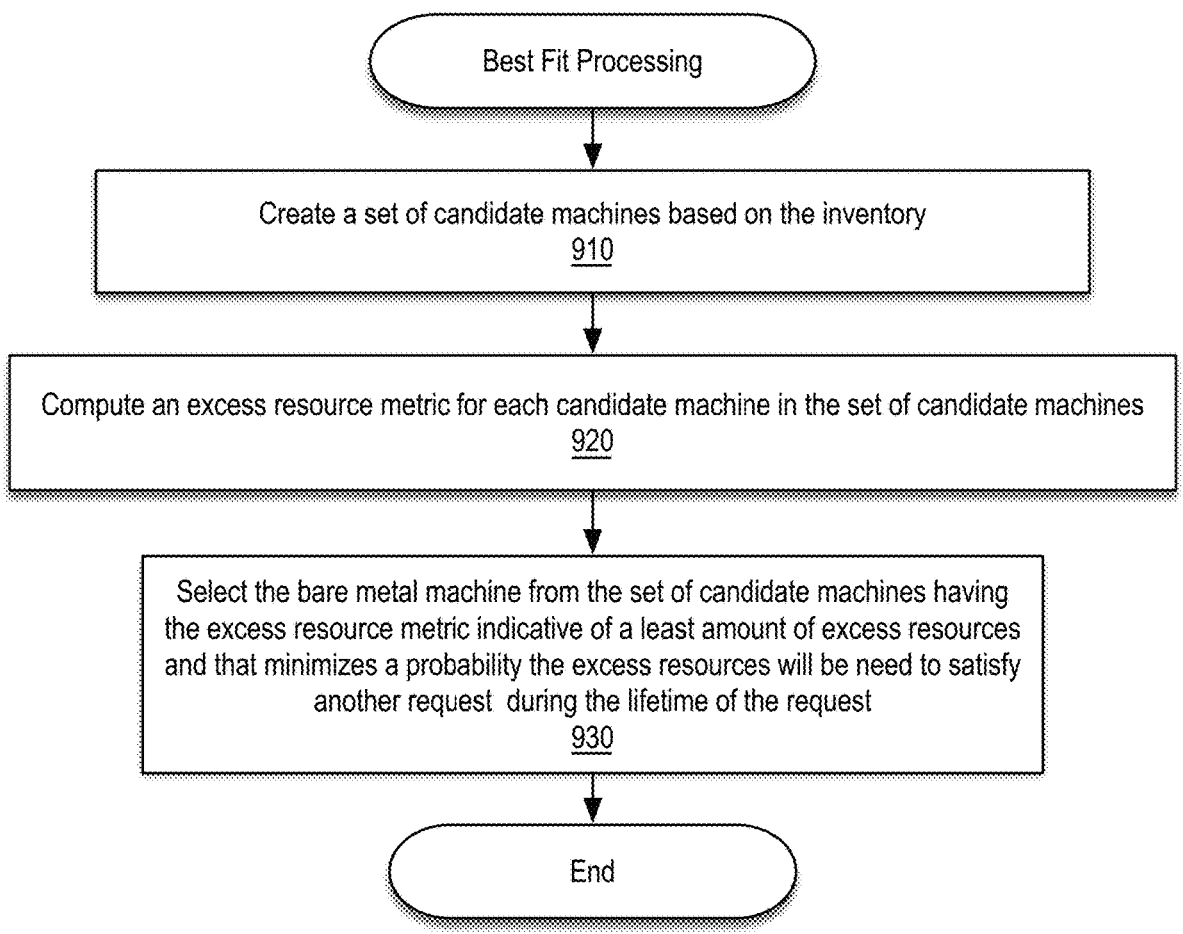
FIG. 9 is a flow diagram illustrating best fit processing in accordance with another example embodiment.

FIG. 9 is a flow diagram illustrating best fit processing in accordance with another example embodiment. In the context of the present example, additional information is assumed to be available to assist the machine selection process. For example, information regarding a lifespan of the cluster request may be included as part of the cluster request or learned based on historical data. Additionally, information that quantifies a probability metric at the machine-level or the resource-level that is indicative of a probability that a machine or resource will be needed to satisfy a subsequent request during the lifespan may be included with the inventory or learned based on historical data. Blocks 910 and 920 may be as described above with reference to FIG. 8. At block 930, the bare metal machine is selected from the set of candidate machines having an excess resource metric indicative of a least amount of excess resources and that also minimizes a probability the excess resources will be needed to satisfy another request during the lifetime of the request. According to one embodiment, this minimization involves minimizing the sum of the probability metrics of the excess resources of the selected bare metal machine. In alternative embodiments, the minimization may be performed as the machine-level to minimize the probability the selected machine will be needed to satisfy another request during the lifetime of the request.

While for sake of brevity some examples of a machine selection approach have been provided above with reference to FIGS. 8 and 9, those skilled in the art will appreciate the applicability of the methodologies described herein extend beyond these particular examples. For example, to the extent metadata or information associated with bare metal machines is available that is indicative of their relative power usage, security, reliability, and/or other factors that may be desirable as the basis on which to prioritize machine selection, such metadata or information may be taken into consideration by the machine selection process. Furthermore, in some embodiments, machine learning and/or big data analytics may be used by the CaaS controller to reveal patterns and/or probabilities of cluster request for users, workloads, machines and/or resources. Since the provider manages the site and therefore has insight into, among other things, the users, cluster requests made by particular users over time, machine demand and usage over time, and what is being run on the private cloud infrastructure, historical data may be used alone or in combination with machine learning to assist the machine selection process, For example, the managed CaaS system may "learn" that a particular user commonly requests bigger machines than necessary for the workload at issue and a result the managed CaaS system may allocate a machine that is slightly smaller than requested by the particular user. Similarly, the managed CaaS system may observe a pattern that the particular user tends to request undersized machines and proactively offer the particular user the option to select a larger machine. Alternatively or additionally, the managed CaaS system may take into consideration machine and/or resource demand/usage patterns so as to optimize allocation of machines in a manner that increases the likelihood of machine availability for anticipated workload demands and hence profitability of the managed CaaS for the cloud provider.

Additional machine selection examples include, but are not limited to:

Using information regarding security vulnerability of particular machine configurations, operating systems, application programs and/or combinations thereof to guide the machine selection process Using of machine learning to optimize machine configurations, operating system parameters, application programs and/or combinations thereof for commonly observed workloads Using characteristics that affect availability such as ensuring that machines providing redundancy have independent power connections and network paths Ensuring workloads that might require significant power are placed on machines in locations with favorable cooling (e.g., put jobs that are likely to run hot on machines that are right over the air conditioner vents)

Using performance characteristics to optimize the performance of the resources allocated. For example, if there are multiple speed networks in the data center, ensuring workloads that require significant network bandwidth are allocated on high speed networks.

Cost of operations—some machines require more power and cooling to perform the same work, and for workloads that require significant power, placing them on machines that have lower power requirements.

Reliability—Some machines might have better track records

Excess capacity—If certain workloads are more likely than others to grow, potential future disruptions may be avoided by putting such workloads on bigger machines.

Figure 10:
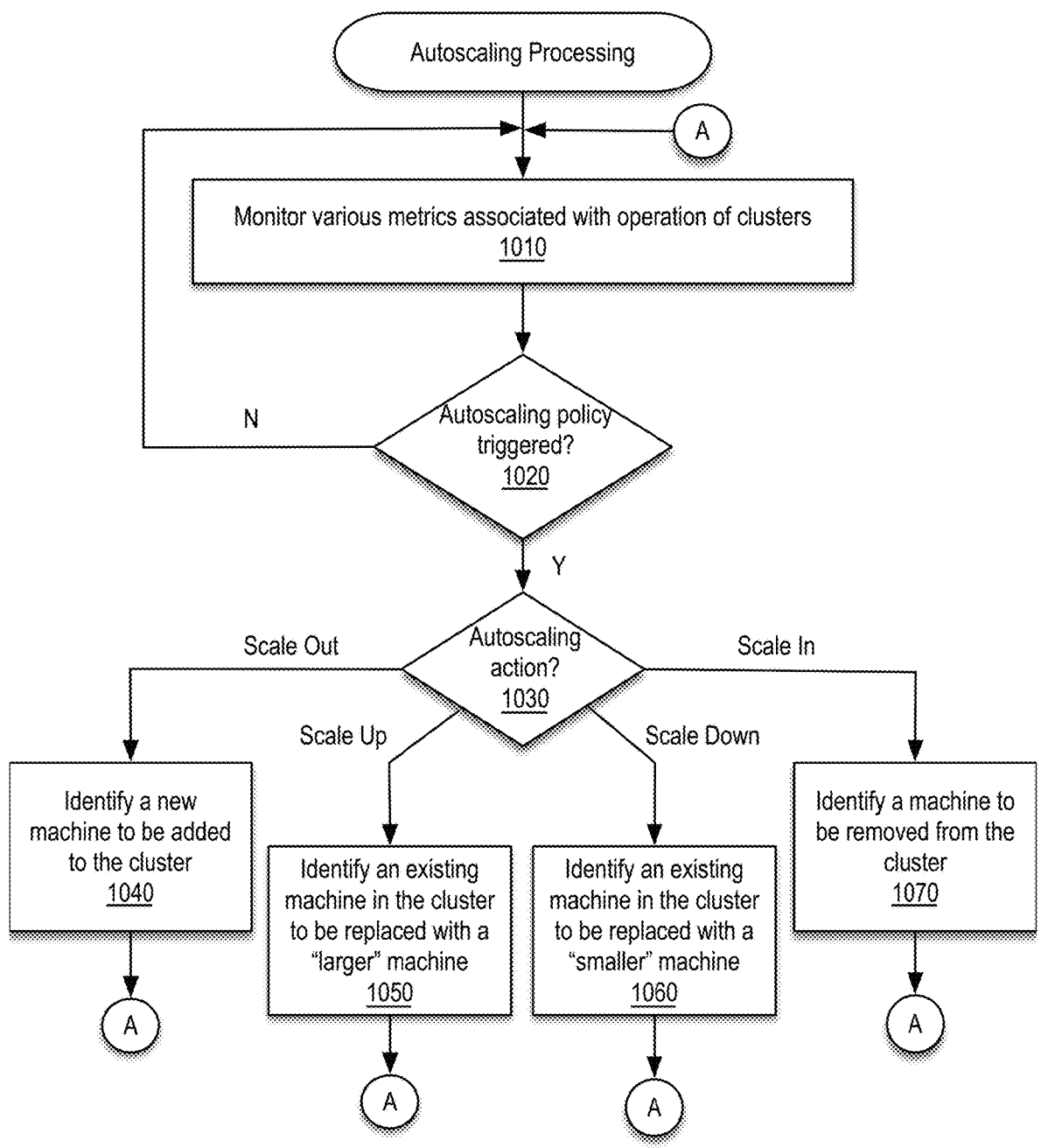
FIG. 10 is a high-level flow diagram illustrating autoscaling processing in accordance with an example embodiment.

FIG. 10 is a high-level flow diagram illustrating autoscaling processing in accordance with an example embodiment. In the context of the present example, cloud-bursting or workload shifting techniques may be used to facilitate handling of various autoscaling actions (e.g., scale out to add a component to a cluster to spread out the load among more components, scale up a component of the cluster, for example, to make the component bigger or faster so that the component can handle more load, scale in to remove a component from a cluster to consolidate the load among fewer components, and scale down a component of the cluster, for example, to make the component smaller or slower so that the component can more cost efficiently handle less load). In one embodiment, an autoscaling policy may be provided at the time of cluster creation as part of cluster information (e.g., cluster blueprint 105) and may specify conditions (e.g., upper bounds and/or lower bounds for metric values or statistics and corresponding time periods) for triggering corresponding autoscaling actions (e.g., scale out or scale in the machine instances of a cluster by a particular amount). In one embodiment, an autoscaling policy may include a rule (e.g., a conditional expression) and a corresponding autoscaling action to be performed when the rule is satisfied (e.g., when the conditional expression is true). For example, an autoscaling policy for a particular cluster may indicate an additional small bare metal machine is to be added to the cluster responsive to any central processing unit (CPU) of an existing bare metal machine in the cluster exceeding an average of 90% utilization over a period of 1 hour. Those skilled in the art will appreciate instantaneous values of metrics or various other statistics (e.g., mean, maximum, minimum, standard deviation, percentiles, or the like) for metrics may be used to define autoscaling policies.

At block 1010, various metrics associated with operation of clusters are monitored. According to one embodiment, a CaaS controller (e.g., CaaS controller 160) periodically retrieves metrics (e.g., processing resource utilization, central processing unit (CPU) utilization, graphical processing unit (GPU) utilization, memory utilization, inbound and/or outbound network traffic, Input/Output Operations Per Second (IOPs), raw speed, latency, redundancy, disk Input/Output (I/O), and transaction count) from the container orchestration system (e.g., Kubernetes, Docker Swarm, or the like) in which the clusters are running via an appropriate container cluster manager (e.g., container cluster manager 170). Alternatively, the container cluster manager may periodically push such metrics to the CaaS controller.

At decision block 1020, a determination is made regarding whether an autoscaling policy has been triggered. According to one embodiment, the autoscaling policy is evaluated with reference to the metrics obtained in block 1010. For example, an appropriate value or statistical measure relating to appropriate metrics may be used to evaluate one or more rules of the autoscaling policy. When a rule is satisfied (e.g., when the conditional expression is true), processing continues with decision block 1030; otherwise, processing loops back to block 1010 to continue monitoring.

At decision block 1030, an autoscaling action is identified. According to one embodiment, the autoscaling action may be one of scale out, scale up, scale down, or scale in and is In the context of the present example, when the autoscaling action corresponding to the rule that has been determined to be satisfied is scale out, then processing continues with block 1040. When the corresponding autoscaling action is scale up, then processing continues with block 1050. When the rule triggers an scale down autoscaling action, then processing continues with block 1060. When the corresponding autoscaling action is scale in, then processing continues with block 1070.

At block 1040, a new machine to be added to the cluster is identified. According to one embodiment, the scale out action identifies a type and quantity of machines to be added to the cluster at issue. Assuming it is a bare metal machine that is to be added to the cluster, based on the type and quantity of bare metal machines that are to be added, a machine selection process may be performed to identify the new machine(s). Non-limiting examples of machine selection processes that may be used have been described above with reference to FIGS. 8 and 9. According to one embodiment, a scale out action may involve cloud-bursting or workload shifting to deal with peaks in demand. For example, a workload may be performed within a private cloud of a customer and burst to a public cloud when needed to meet peak demands in excess of those capable of being satisfied with on-premises infrastructure (e.g., infrastructure 110). In this manner, customers of the managed container service may be provided with flexible capacity as needed.

At block 1050, an existing machine in the cluster that is to be replaced with a "larger" machine is identified. According to one embodiment, the existing machine may be a machine containing a resource whose metric(s) triggered the scale up action. For example, an existing "small" machine may be replaced with a machine of the next size up (e.g., a "medium" machine). Alternatively, if the machine containing the resource whose metric(s) triggered the scale up action is already the largest machine-size available, then a different machine (e.g., a "small" or "medium" machine) within the cluster may be identified for replacement. In some embodiments, as described above with reference to handling of a scale out action, a scale up action may involve replacing private cloud infrastructure (e.g., a bare metal machine located on-premises) with a physical or virtual machine in a public cloud. In other examples, the existing machine and the "larger" machine may both be bare metal machines in on-premises infrastructure inventory.

At block 1060, an existing machine in the cluster to be replaced with a "smaller" machine is identified. According to one embodiment, the existing machine may be a machine containing a resource whose metric(s) triggered the scale down action. For example, an existing "large" machine may be replaced with a machine of the next size down (e.g., a "medium" machine). Alternatively, if the machine containing the resource whose metric(s) triggered the scale down action is already the smallest machine-size available, then a different machine (e.g., a "medium" machine) within the cluster may be identified for replacement. In some embodiments, preference may be given to first reducing utilization of public cloud infrastructure. For example, a scale down action may involve replacing a physical or virtual machine in a public cloud with private cloud infrastructure (e.g., a bare metal machine located on-premises). In other examples, the existing machine and the "smaller" machine may both be bare metal machines in the on-premises infrastructure inventory.

At block 1070, a machine to be removed from the cluster is identified. According to one embodiment, the scale in action identifies a type and quantity of machines to be removed from the cluster at issue. Assuming it is a bare metal machine that is to be removed from the cluster, based on the type and quantity of bare metal machines that are to be removed, a machine selection process similar to that described above with reference to FIGS. 8 and 9 may be used, for example, to identify a machine to be removed that will result in minimization of excess resources of the remaining machines in the cluster. According to one embodiment, a scale in action may involve reversing cloud-bursting or workload shifting that has previously been performed to deal with peaks in demand. For example, after a peak in demand has past utilization of public cloud infrastructure by the cluster may first be reduced before reducing private cloud infrastructure (e.g., a bare metal machine located on-premises). In this manner, the cloud provider may meter a customer's actual usage of public cloud infrastructure and only bill the customer for what they use, thereby providing flexible and on-demand capacity when insufficient resources are available in the customer's private cloud.

In addition or as an alternative to the various optimizations, machine learning and big data analytic approaches described herein, in some embodiments, identifying a new bare metal machine to add to a cluster (e.g., responsive to a scale out or scale up action that calls for a new machine to be identified to add to a cluster or to replace an existing "smaller" machine in a cluster), machine learning or big data analytics may be used to intelligently select a particular machine configuration (of the limited machines available in the inventory) that has evidenced an ability perform well for the workload at issue. Similarly, with respect to a scale in or scale down action that calls for an existing machine within a cluster to be identified for removal or replacement by a "smaller" machine, identification of the existing machine to remove from the cluster, may involve, for example, identifying a particular machine configuration that does not perform as well as other machines in the cluster for the particular workload(s) at issue.

While the above example is described in the context of "auto scaling," the methodologies described herein are thought to be equally applicable to "auto placement." So, for example, when evaluating whether to move work from one machine (M1), which may not be the most efficient for the work at issue for one or more reasons, to another (M2), which is deemed better for the work at issue, a copy of instances running on M1 may be brought up on M2 and then M1 may be shut down.

While the above example is described with reference to various metrics associated with infrastructure, those skilled in the art will appreciate a variety of other metrics from the environment may also be used. For example, the various metrics associated with operation of clusters evaluated in decision block 1020 may include, among other potential metrics, temperature, cooling cost (machines near vents might be cheaper to cool than those far away), and/or power consumption (some machines types require less power per unit work), power cost (a large installation might have more than one power source).

For sake of illustrating a concrete example of how policy-based constraints may influence auto scaling, consider an autoscaling policy that indicates a "large" worker node should be added when CPU utilization of any existing worker node is greater than 70% over a period of 1 hour and a policy-based constraint associated with the cluster expresses a desire to minimize power costs. In such a scenario, when the autoscaling policy is triggered to scale out the cluster, when evaluating candidate machines for the new worker node to be added to the cluster, a particular power source associated with candidate machines may be taken into consideration. Similar policy-based constraints may be taken into consideration for scale up, scale in, and/or scale down actions.

Figure 11:
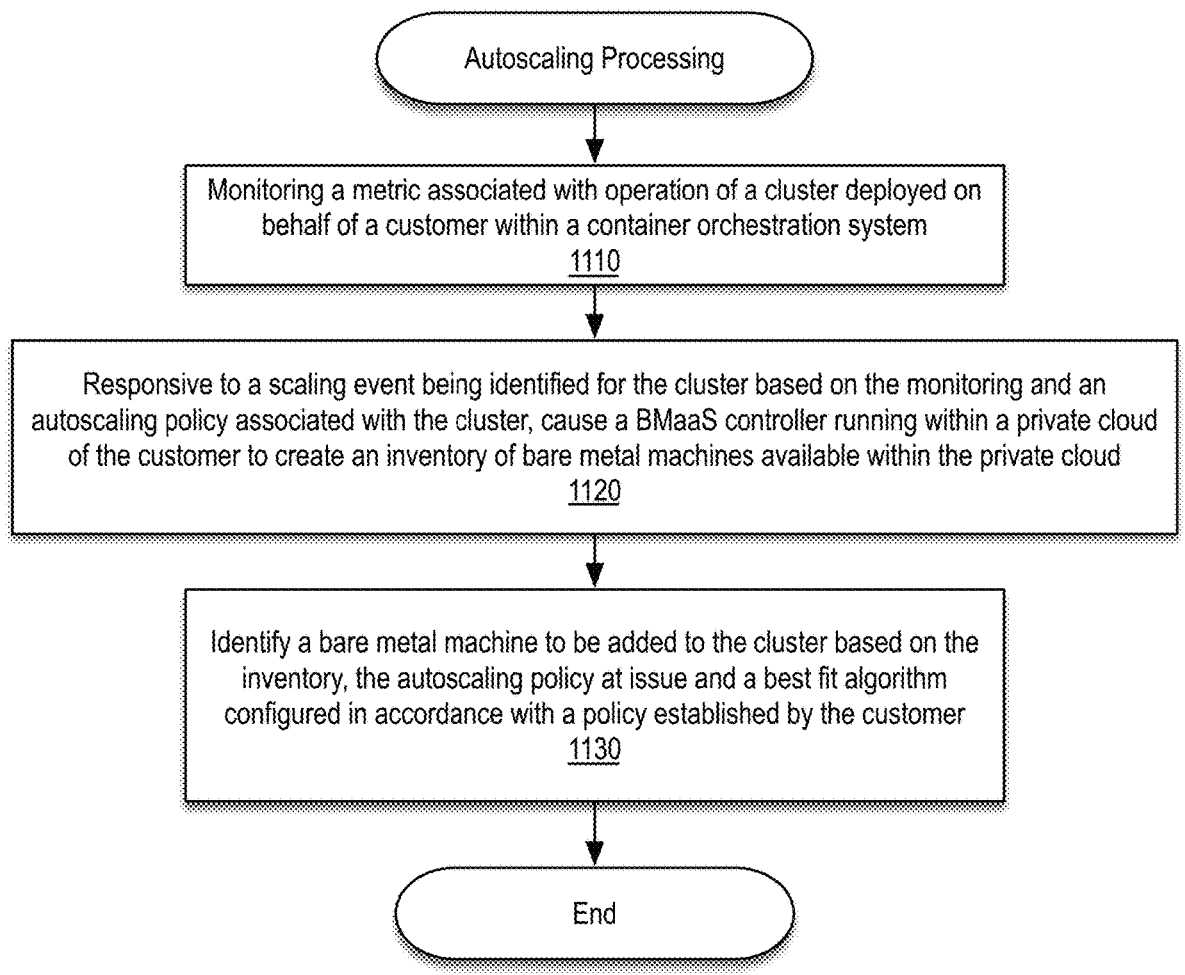
FIG. 11 is a flow diagram illustrating autoscaling processing involving identifying a bare metal machine to be added to a cluster in accordance with an example embodiment.

FIG. 11 is a flow diagram illustrating autoscaling processing involving identifying a bare metal machine to be added to a cluster in accordance with an example embodiment. At block 1110, a metric is monitored that is associated with operation of a cluster deployed on behalf of a customer within a container orchestration system. Non-limiting examples of the metric include central processing unit (CPU) utilization, memory utilization, inbound and/or outbound network traffic, latency, disk Input/Output (I/O), and transaction count. Depending upon the particular implementation, the metric may be pulled by a CaaS controller (e.g., CaaS controller 160) periodically or on demand from the container orchestration system (e.g., Kubernetes, Docker Swarm, or the like) in which the cluster at issue is running via an appropriate container cluster manager (e.g., container cluster manager 170). Alternatively, the container cluster manager may push such the metric to the CaaS controller.

At block 1120, responsive to a scaling event being identified for the cluster based on the monitoring and an autoscaling policy associated with the cluster, a BMaaS controller running within a private cloud of the customer is caused to create or update an inventory of bare metal machines available within the private cloud. According to one embodiment, the inventory contains real-time information indicative of respective resources (e.g., a number of processor cores, an amount of memory, network capacity, and/or storage performance) for one or more types of infrastructure (e.g., infrastructure 110), including a set of bare metal machines, that are currently available (e.g., are not currently deployed for use by another cluster) for use in connection with supporting the managed container service. Depending upon the particular implementation, the inventory may be requested from a BMaaS provider by the CaaS controller directly (e.g., via a bare metal SaaS portal of the BMaaS provider) or indirectly (e.g., via the CaaS portal).

At block 1130, a bare metal machine is identified for addition to the cluster based on the inventory received in block 1120, the autoscaling policy at issue, and a best fit algorithm configured in accordance with a policy established by or on behalf of the customer. According to one embodiment, the type and number of machines desired to be added to the cluster are identified by the autoscaling rule of the autoscaling policy that has been triggered. Alternatively, the type of machine to be added may be selected to be consistent with other existing machines that are already part of the cluster. Despite the customer presumably having a variety of bare metal machine configurations represented within their private cloud, it is unlikely the customer will have a sufficient number of such configurations to precisely match the range of all potential cluster requests. As such, embodiments described herein provide a policy-based approach to allow the cloud provider and/or the customer to express one or more machine-selection priorities to be applied as part of a best fit algorithm. Non-limiting examples of best fit processing that may be part of the best fit algorithm are described above with reference to FIGS. 8 and 9.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 12:
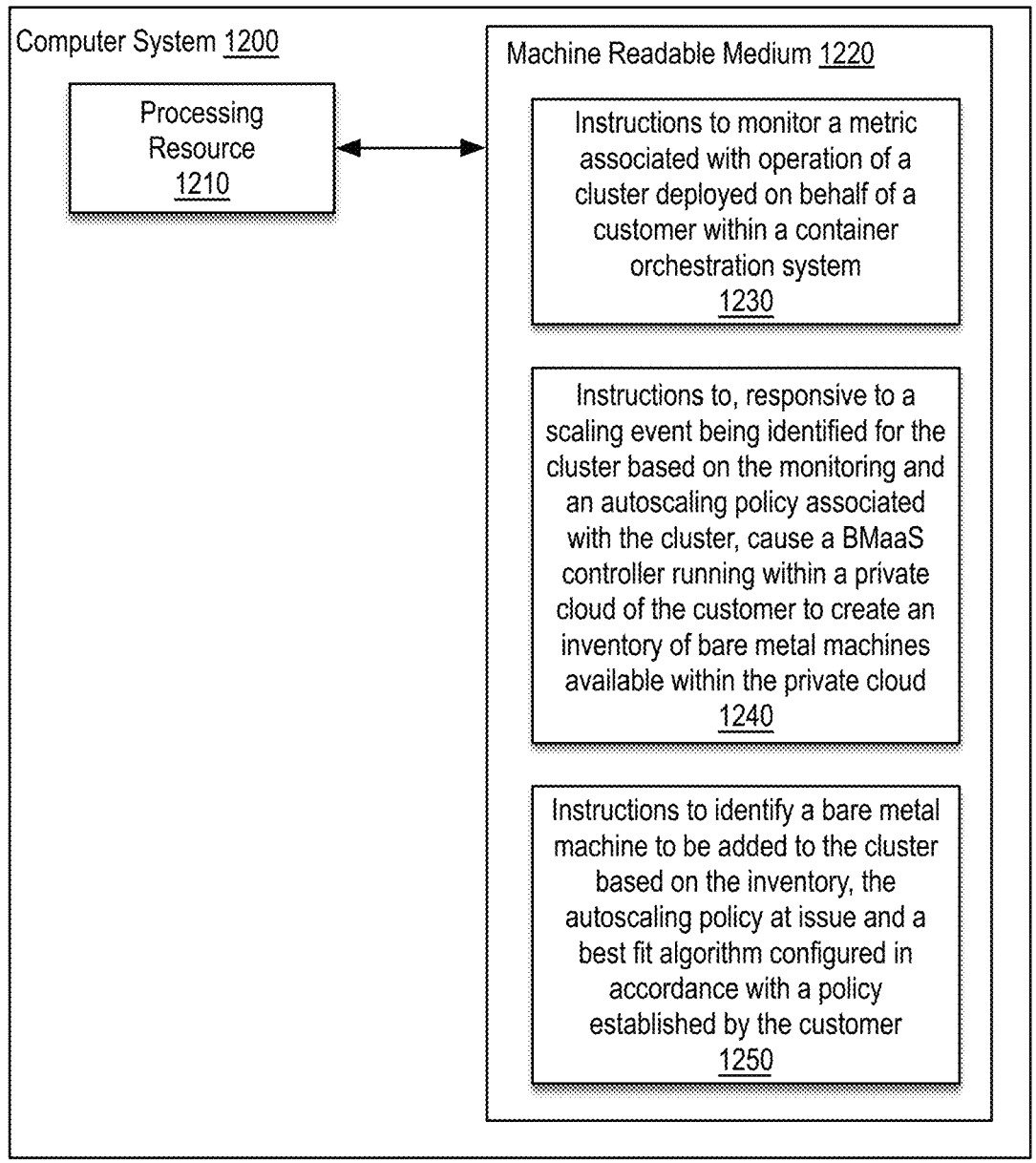
FIG. 12 is a block diagram of a computer system in accordance with an embodiment.

FIG. 12 is a block diagram of a computer system in accordance with an embodiment. In the example illustrated by FIG. 12, computer system 1200 includes a processing resource 1210 coupled to a non-transitory, machine readable medium 1220 encoded with instructions to perform a private cloud gateway creation processing. The processing resource 1210 may include a microcontroller, a microprocessor, central processing unit core(s), an ASIC, an FPGA, and/or other hardware device suitable for retrieval and/or execution of instructions from the machine readable medium 1220 to perform the functions related to various examples described herein. Additionally or alternatively, the processing resource 1210 may include electronic circuitry for performing the functionality of the instructions described herein.

The machine readable medium 1220 may be any medium suitable for storing executable instructions. Non-limiting examples of machine readable medium 1220 include RAM, ROM, EEPROM, flash memory, a hard disk drive, an optical disc, or the like. The machine readable medium 1220 may be disposed within the computer system 1200, as shown in FIG. 12, in which case the executable instructions may be deemed "installed" or "embedded" on the computer system 1200. Alternatively, the machine readable medium 1220 may be a portable (e.g., external) storage medium, and may be part of an "installation package." The instructions stored on the machine readable medium 1220 may be useful for implementing at least part of the methods described herein.

In the context of the present example, the machine readable medium 1220 is encoded with a set of executable instructions 1230-1250. It should be understood that part or all of the executable instructions and/or electronic circuits included within one block may, in alternate implementations, be included in a different block shown in the figures or in a different block not shown.

Instructions 1230, upon execution, cause the processing resource 1210 to monitor a metric associated with operation of a cluster deployed on behalf of a customer within a container orchestration system. In one embodiment, instructions 1230 may correspond generally to instructions for performing block 1110 of FIG. 11.

Instructions 1240, upon execution, cause the processing resource 1210 to, responsive to a scaling event being identified for the cluster based on the monitoring and an autoscaling policy associated with the cluster, cause a BMaaS controller running within a private cloud of the customer to create an inventory of bare metal machines available within the private cloud. In one embodiment, instructions 1240 may correspond generally to instructions for performing block 1120 of FIG. 11.

Instructions 1250, upon execution, cause the processing resource 1210 to identify a bare metal machine to be added to the cluster based on the inventory, the autoscaling policy at issue and a best fit algorithm configured in accordance with a policy established by the customer. In one embodiment, instructions 1250 may correspond generally to instructions for performing the block 1130 of FIG. 11.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A system comprising:
   a processing resource; and
   a non-transitory computer-readable medium, coupled to the processing resource, having stored therein instructions that when executed by the processing resource cause the processing resource to:
   monitor a metric associated with operation of a cluster deployed on behalf of a customer of a managed container service within a container orchestration system;
   responsive to a scaling event being identified for the cluster based on the monitoring and an autoscaling policy associated with the cluster, cause a Bare-Metal-as-a-Service (BMaaS) provider associated with the private cloud to create an inventory of a plurality of bare-metal machines available within the private cloud; and
   identify a bare metal machine to be added to the cluster by selecting among the plurality of bare-metal machines based on the auto scaling policy, the inventory and a best fit algorithm configured in accordance with a policy established by or on behalf of the customer.

2. The system of claim 1, wherein the instructions further cause the processing resource to receive the autoscaling policy as part of a definition of the cluster from a user of the customer, wherein the definition of the cluster includes information regarding a machine configuration desired to be used by the cluster.

3. The system of claim 1, wherein the scaling event comprises triggering of a scale out action of a rule of the autoscaling policy.

4. The system of claim 1, wherein the instructions further cause the processing resource to provide the customer with flexible capacity by using cloud-bursting or workload shifting when demand associated with the cluster exceeds a capacity of the private cloud.

5. The system of claim 1, wherein the policy expresses a goal of minimizing excess resources of the plurality of bare metal machines, wherein the inventory includes information that quantifies a value of each resource for each of the plurality of bare-metal machines, and wherein the instructions further cause the processor to:
   identify a subset of the plurality of bare-metal machines having a type and a quantity of resources that satisfy a machine specification identified by the autoscaling policy;
   for each machine in the subset, computing an excess resource metric based on an amount of resources of the machine that are in excess of resources required to satisfy the machine specification; and
   selecting as the particular bare metal machine a machine of the subset having the excess resource metric indicative of a least amount of excess resources.

6. The system of claim 1, wherein the instructions further cause the processing resource to request the BMaaS provider to create the inventory via a BMaaS portal associated with the BMaaS provider.

7. The system of claim 6, wherein deployment of the cluster was responsive to a request received via a Container-as-a-Service (CaaS) portal.

8. The system of claim 7, wherein the CaaS portal and the BMaaS portal are operable within a public cloud.

9. The system of claim 1, wherein the system comprises a CaaS controller operable within the public cloud.

10. The system of claim 1, wherein the system comprises a CaaS controller operable within the private cloud.

11. A non-transitory machine readable medium storing instructions that when executed by a processing resource of a computer system cause the processing resource to:
   monitor a metric associated with operation of a cluster deployed on behalf of a customer of a managed container service within a container orchestration system;
   responsive to a scaling event being identified for the cluster based on the monitoring and an autoscaling policy associated with the cluster, cause a Bare-Metal-as-a-Service (BMaaS) provider associated with the private cloud to create an inventory of a plurality of bare-metal machines available within the private cloud; and
   identify a bare metal machine to be added to the cluster by selecting among the plurality of bare-metal machines based on the auto scaling policy, the inventory and a best fit algorithm configured in accordance with a policy established by or on behalf of the customer.

12. The non-transitory machine readable medium of claim 11, wherein the instructions further cause the processing resource to receive the autoscaling policy as part of a definition of the cluster from a user of the customer, wherein the definition of the cluster includes information regarding a machine configuration desired to be used by the cluster.

13. The non-transitory machine readable medium of claim 11, wherein the scaling event comprises triggering of a scale out action of a rule of the autoscaling policy.

14. The non-transitory machine readable medium of claim 13, wherein the instructions further cause the processing resource to provide the customer with flexible capacity by using cloud-bursting or workload shifting when demand associated with the cluster exceeds a capacity of the private cloud.

15. The non-transitory machine readable medium of claim 11, wherein the policy expresses a goal of minimizing excess resources of the plurality of bare metal machines, wherein the inventory includes information that quantifies a value of each resource for each of the plurality of bare-metal machines, and wherein the instructions further cause the processor to:
- identify a subset of the plurality of bare-metal machines having a type and a quantity of resources that satisfy a machine specification identified by the autoscaling policy;
- for each machine in the subset, computing an excess resource metric based on an amount of resources of the machine that are in excess of resources required to satisfy the machine specification; and
- selecting as the particular bare metal machine a machine of the subset having the excess resource metric indicative of a least amount of excess resources.

16. The non-transitory machine readable medium of claim 11, wherein the instructions further cause the processing resource to request the BMaaS provider to create the inventory via a BMaaS portal associated with the BMaaS provider.

17. A method comprising:
- monitoring, by a processing resource of a Container-as-a-Service (CaaS) controller of a managed container service, a metric associated with operation of a cluster deployed on behalf of a customer of the managed container service within a container orchestration system;
- responsive to a scaling event being identified for the cluster based on the monitoring and an autoscaling policy associated with the cluster, causing, by the processing resource, a Bare-Metal-as-a-Service (BMaaS) provider associated with the private cloud to create an inventory of a plurality of bare-metal machines available within the private cloud; and
- identifying, by the processing resource, a bare metal machine to be added to the cluster by selecting among the plurality of bare-metal machines based on the autoscaling policy, the inventory and a best fit algorithm configured in accordance with a policy established by or on behalf of the customer.

18. The method of claim 17, further comprising receiving, by the processing resource, the autoscaling policy as part of a definition of the cluster from a user of the customer, wherein the definition of the cluster includes information regarding a machine configuration desired to be used by the cluster.

19. The method of claim 17, wherein the scaling event comprises triggering of a scale out action of a rule of the autoscaling policy.

20. The method of claim 17, further comprising causing, by the processing resource, the customer to be provided with flexible capacity by using cloud-bursting or workload shifting when demand associated with the cluster exceeds a capacity of the private cloud.

* * * * *